United States Patent [19]

Koether et al.

[11] Patent Number: 5,473,977
[45] Date of Patent: Dec. 12, 1995

[54] PLANETARY SPIT ARRANGEMENT

[75] Inventors: Bernard G. Koether, Tequesta, Fla.; Richard J. Mangini, Brookfield, Conn.

[73] Assignee: Technology Licensing Corporation, Tequesta, Fla.

[21] Appl. No.: 25,359

[22] Filed: Feb. 26, 1993

[51] Int. Cl.[6] ........................................ A47J 37/04
[52] U.S. Cl. ........................... 99/421 P; 29/401.1
[58] Field of Search .................... 99/421 P; 29/401.1

[56] References Cited

U.S. PATENT DOCUMENTS

| | | | |
|---|---|---|---|
| 835 | 7/1838 | Pierce . | |
| 1,723,145 | 8/1929 | Fernald | 99/421 P |
| 1,762,035 | 6/1930 | Soylian | 99/421 P |
| 1,786,300 | 12/1930 | Harrison | 99/421 P |
| 2,012,702 | 8/1935 | Zolotas | 99/421 P |
| 2,039,541 | 5/1936 | Lekometros | 99/421 P |
| 2,142,390 | 1/1939 | Zerr | 99/421 P |
| 2,181,847 | 11/1939 | Finizio | 99/421 P |
| 2,600,760 | 6/1952 | Guffey . | |
| 2,762,293 | 9/1956 | Boyajian | 99/421 P |
| 2,809,579 | 10/1957 | Theisen . | |
| 2,833,205 | 5/1958 | Purtzer | 99/421 P |
| 2,985,096 | 5/1961 | Wolske . | |
| 3,125,015 | 3/1964 | Schlaegel | 99/421 P |
| 3,196,776 | 7/1965 | Norton | 99/421 P |
| 3,263,593 | 8/1966 | Appleman . | |
| 3,273,489 | 9/1966 | Wilson . | |
| 3,782,268 | 1/1974 | Navarro | 99/421 P |
| 3,827,345 | 8/1974 | Willson | 99/325 |
| 4,214,516 | 7/1980 | Friedl et al. | 99/421 P |
| 4,366,182 | 12/1982 | Köhler et al. . | |
| 4,409,452 | 10/1983 | Oouchi et al. . | |
| 4,469,019 | 9/1984 | Baer | 99/339 |
| 4,491,065 | 1/1985 | Poulson | 99/327 |
| 4,561,348 | 12/1985 | Halters et al. | 99/421 H |
| 4,635,539 | 1/1987 | Tanaka | 99/421 H |
| 4,636,949 | 1/1987 | Longabaugh . | |
| 4,968,515 | 11/1990 | Burkett et al. . | |
| 5,044,262 | 9/1991 | Burkett et al. | 99/327 |
| 5,136,933 | 8/1992 | Derakhshan | 99/421 P |

FOREIGN PATENT DOCUMENTS

| | | | |
|---|---|---|---|
| 0463657 | 1/1992 | European Pat. Off. . | |
| 853400 | 3/1940 | France | 99/421 P |
| 1162985 | 2/1964 | Germany | 99/421 P |
| 2307575 | 8/1973 | Germany . | |
| 527233 | 5/1955 | Italy | 99/421 P |
| 880899 | 10/1961 | United Kingdom | 99/421 P |

*Primary Examiner*—Mark Spisich
*Attorney, Agent, or Firm*—Pennie & Edmonds

[57] ABSTRACT

A planetary gear system for rotating spits in a rotisserie device. The system includes a gearing plate mounted to a wall in the rotisserie. The gearing plate includes a plurality of projections which extend inwardly into the interior of the rotisserie. A gear wheel is positioned adjacent the gearing plate and an idler wheel is positioned opposite the gearing wheel adjacent a second wall of the rotisserie. The gear wheel and idler wheels are rotated in synchronization by a rotatable shaft. A plurality of spits are supported between the gear and idler wheel and moved in a circular path about the shaft as the wheels rotate. The spits further include a gear which meshes with the projections on the gearing plate as the spits are rotated about the shaft, further effecting rotation of the spits about their longitudinal axis.

9 Claims, 7 Drawing Sheets

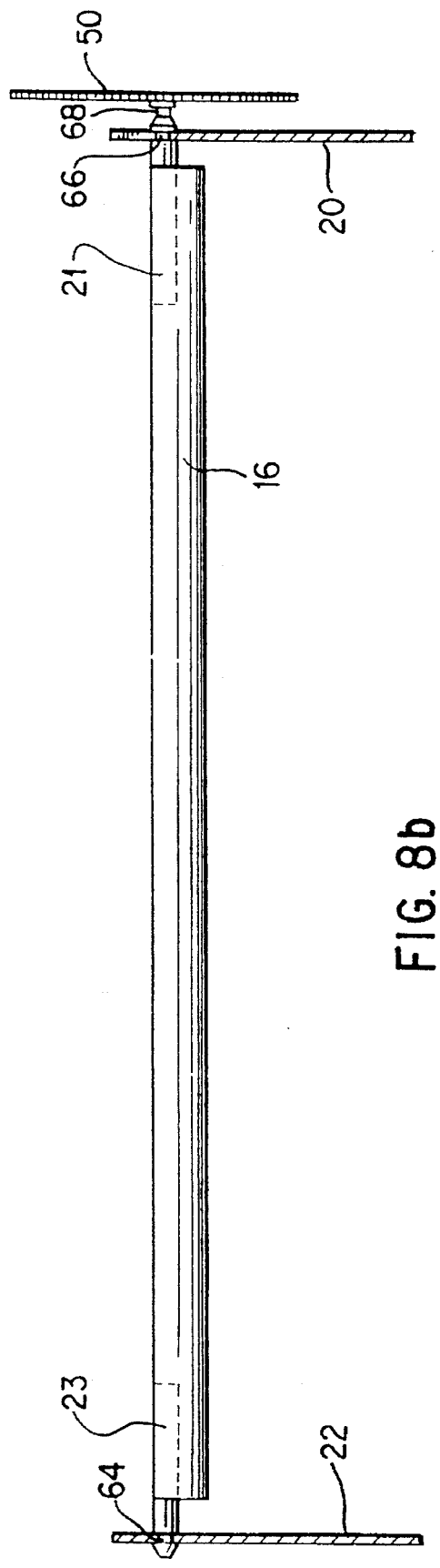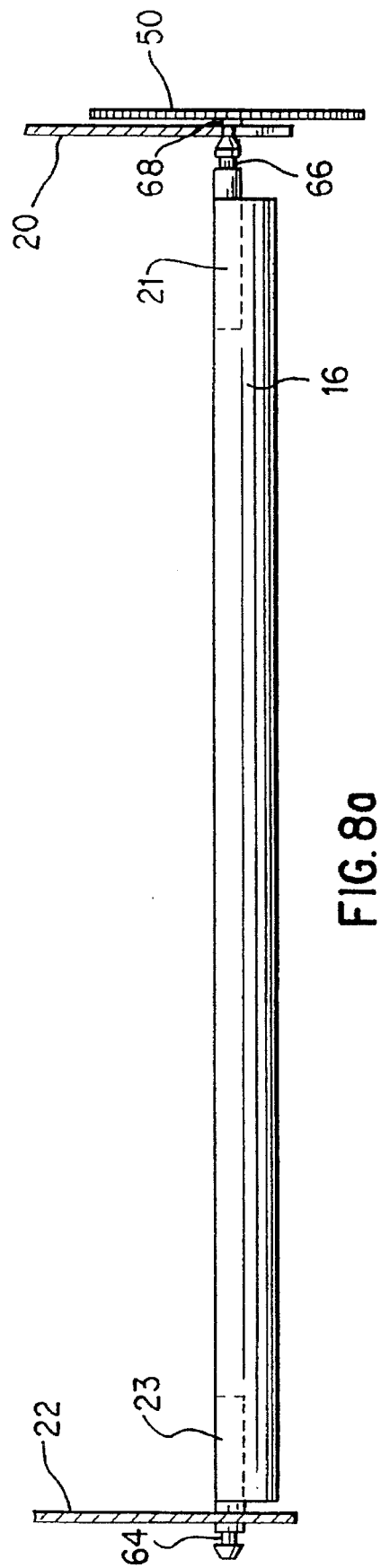

PLANETARY SPIT ARRANGEMENT

BACKGROUND OF THE INVENTION

The invention relates to rotisserie cooking devices and, in particular, to a planetary spit arrangement for rotation of spits carrying food to be cooked in a rotisserie.

Rotisserie devices are well known in the art for grilling and cooking meats such as chicken. The rotisseries typically include at least one spit upon which meat to be grilled is placed. The spit is typically moved in a circular path past heating elements in a cooking chamber to effect grilling of the meat supported on the spit.

To ensure more even grilling, planetary spits have been provided which turn about their longitudinal axis in addition to moving in a circular path within the cooking chamber. The planetary spits typically include a gear mechanism positioned on one end of the spit which meshes with a gear mounted in the oven to effect rotation of the spits as they are in turn rotated in the cooking chamber. For example, U.S. Pat. No. 5,136,933 to Derakshan, U.S. Pat. No. 4,214,516 to Friedl et al., and U.S. Pat. No. 3,125,015 to Schlaegel disclose rotisserie devices incorporating various types of planetary spit arrangements.

The number of moving parts in prior art planetary gear arrangements complicates assembly and disassembly of the system when cleaning or repair is required. The close tolerances and precise gear alignment further impede efforts to remove parts from the system and require precise manufacturing processes at increased machining costs.

SUMMARY OF THE INVENTION

It is therefore an object of the present invention to provide a planetary gear arrangement for rotating at least one spit about a longitudinal axis thereof wherein the gear arrangement comprises relatively few moving parts.

It is another object of the invention to provide a rotisserie having spits which are rotated in a planetary fashion therein.

It is a further object of the invention to provide a planetary gear system which can be quickly and easily adapted to existing rotisseries.

It is another object of the invention to provide a base for supporting spits in a vertical position while food is positioned thereon.

It is yet another object of the invention to provide a planetary gear system which facilitates disassembly for cleaning and/or repair of the system components.

The present invention provides a planetary spit arrangement for a rotisserie-type grilling device which comprises relatively few parts. In accordance with the invention, a gearing plate is mounted to a first wall of the rotisserie. The gearing plate includes a plurality of pin-like projections which extend inwardly into the interior of the rotisserie. A gearing wheel is positioned adjacent the gearing plate and an idler plate is opposite the gearing plate, adjacent a second wall of the rotisserie.

The gear wheel and idler wheel are rotated in synchronization by a rotating shaft positioned between the first and second walls of the rotisserie. A plurality of spits are supported between the gear wheel and idler wheel and are moved in a circular path about the rotating shaft as the wheels rotate. An end of each spit includes a planetary gear which meshes with the projections on the gearing plate as the spits are rotated about the shaft, effecting further rotation of the spits about their longitudinal axis.

In accordance with the present invention, a rotisserie comprises a housing defining an interior of the rotisserie and including at least first and second opposed walls. A shaft is positioned between the walls of the housing for rotation therebetween. A first wheel is positioned adjacent the first wall and rotatably driven by the shaft. A second wheel is positioned adjacent the second wall and rotatably driven by the shaft in synchronization with the first wheel.

A plurality of elongated spits extend between the first and second wheels and are supported for rotation thereby, wherein a first end of each of said spits includes a gear member secured thereto. Projecting means engage the gear member on the spits as the spits are rotated by the wheels to effect rotation of each of the spits about a longitudinal axis thereof. The projecting means may comprise a plurality of pins arranged in a symmetrical pattern about the shaft, and the pins may be mounted on a plate secured to of the opposed walls of the housing. The plate may be attached to one of the walls by welding. The first wheel may include a plurality of notches around the circumference thereof and the second wheel may include a plurality of circular apertures around the circumference thereof wherein a first end of each spit is positioned in one of the notches and a second opposed end of each spit is positioned in a corresponding on of said circular apertures. The rotisserie may further comprise means for clamping the first and second wheels.

BRIEF DESCRIPTION OF THE DRAWINGS

FIGS. 8a and 8b are side views illustrating the spits as loaded and supported between the gear and idler wheels;

DETAILED DESCRIPTION OF THE INVENTION

Figure 1:
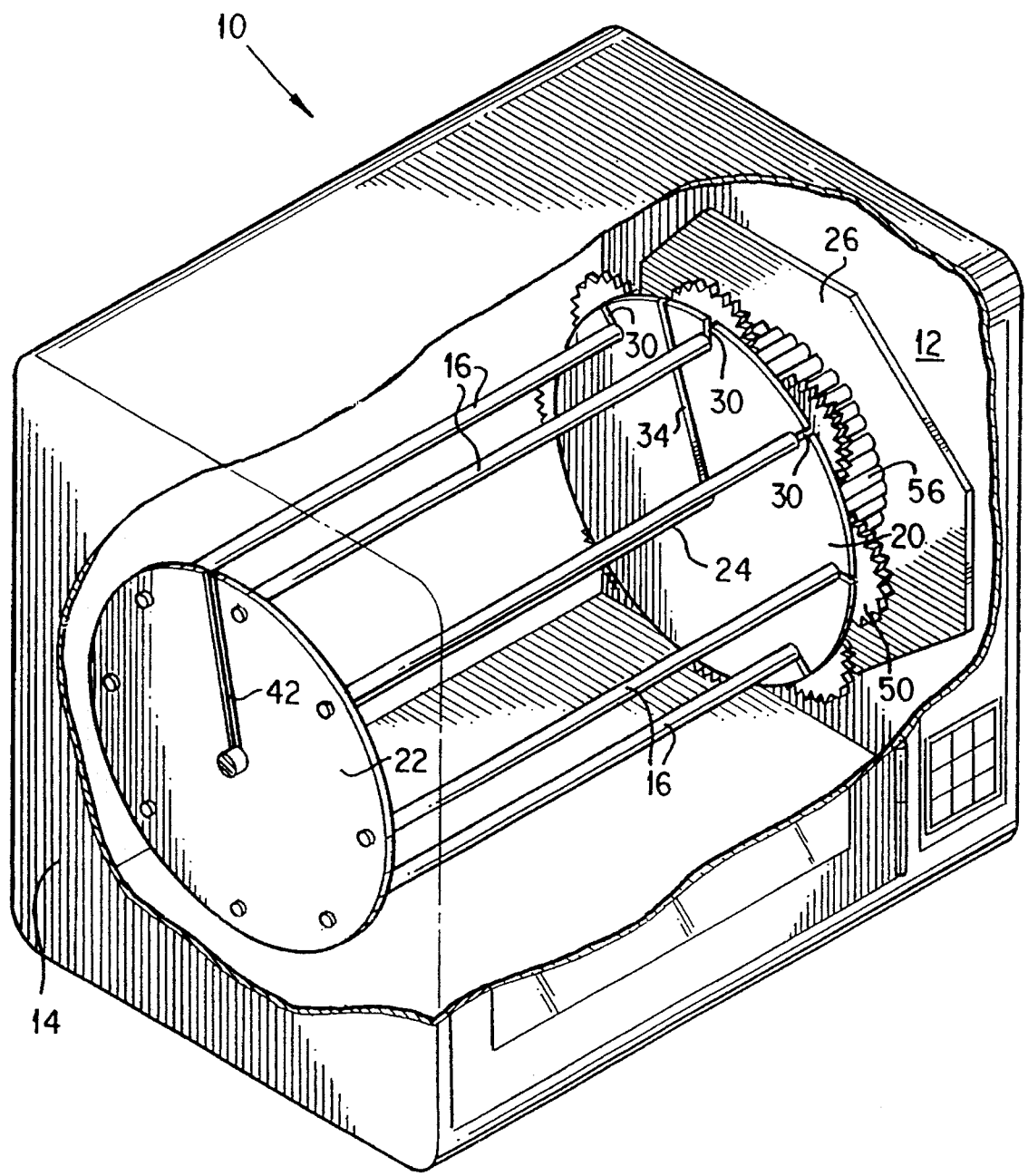
FIG. 1 is a perspective, partial cut-away view of a rotisserie oven incorporating the planetary spit arrangement of the present invention.

FIG. 1 illustrates a rotisserie cooking device 10 for grilling meats or other food products incorporating the planetary spit arrangement of the present invention. The rotisserie comprises a generally rectangular housing defining an interior and includes first and second side walls 12, 14. A plurality of elongated spits generally designated 16 are arranged within the interior of the rotisserie 10 to carry food, such as meat or chicken, to be grilled thereon. The spits 16 are supported at a first end by a gear wheel 20 and at a second, opposite end by an idler wheel 22. Each spit is constructed with first and second supports 21, 23 (FIGS. 7 and 8) at the ends thereof which are secured to the gear wheel and idler wheel 20, 22 respectively. The gear wheel and idler wheel 20, 22 are rotated by a main shaft 24 connected to and driven by a motor (not shown) to move the spits supported therebetween in a circular manner around the interior of the rotisserie 10. One of ordinary skill in the art could select a suitable motor for driving the main shaft 24. The rotisserie further includes a stationary gearing plate 26 secured to a side wall of the rotisserie 10, such as the first side wall 12, adjacent the drive motor.

Figure 4:
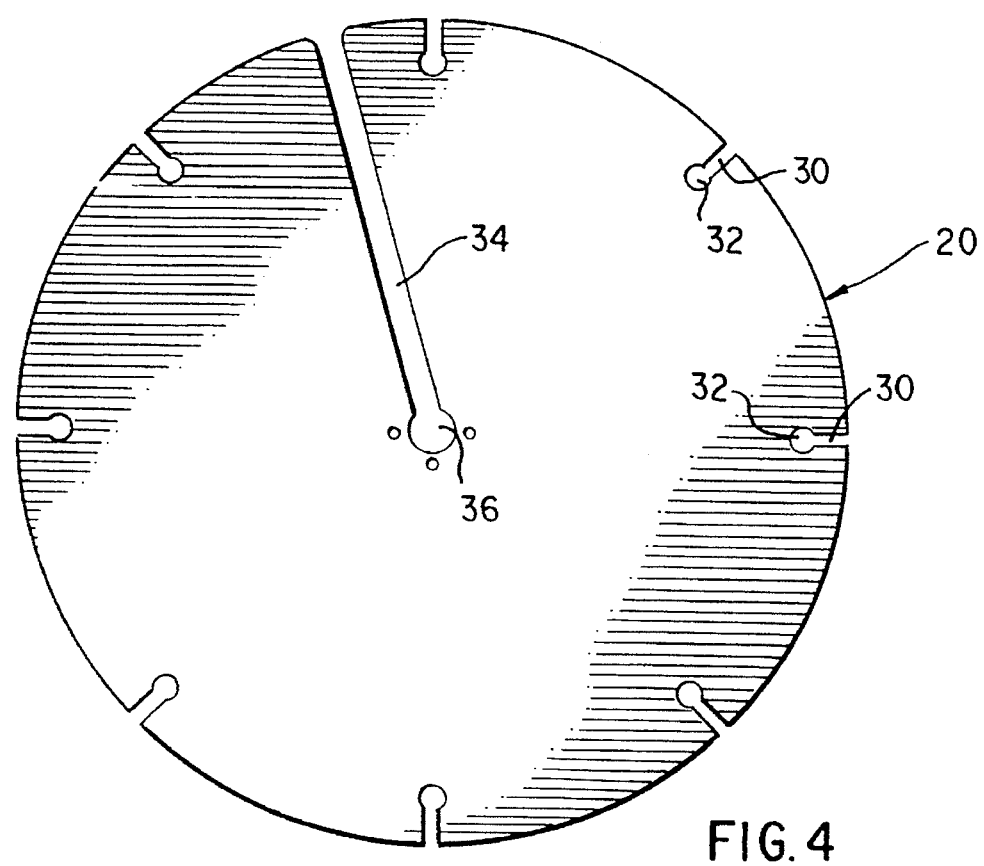
FIG. 4 is a plan view of a gear wheel in accordance with the invention.

As shown in FIG. 4, the gear wheel 20 is substantially circular and comprises a plurality of radial notches 30 spaced equi-distantly around the circumference thereof. Each notch 30 terminates in a generally rounded end 32. The width of the notches 30 is slightly smaller than the diameter of the rounded ends 32 to facilitate loading of the spits 16 as will be described in more detail below. The length of the notches 30 is selected in accordance with the desired spacing between the spits 16 when positioned within the rotisserie device 10. The gear wheel 20 further includes an elongated slot 34 which terminates in a rounded end 36 about the center of the wheel. The width of the slot 34 and diameter of the rounded end 36 approximate the diameter of the main shaft 24.

Figure 2:
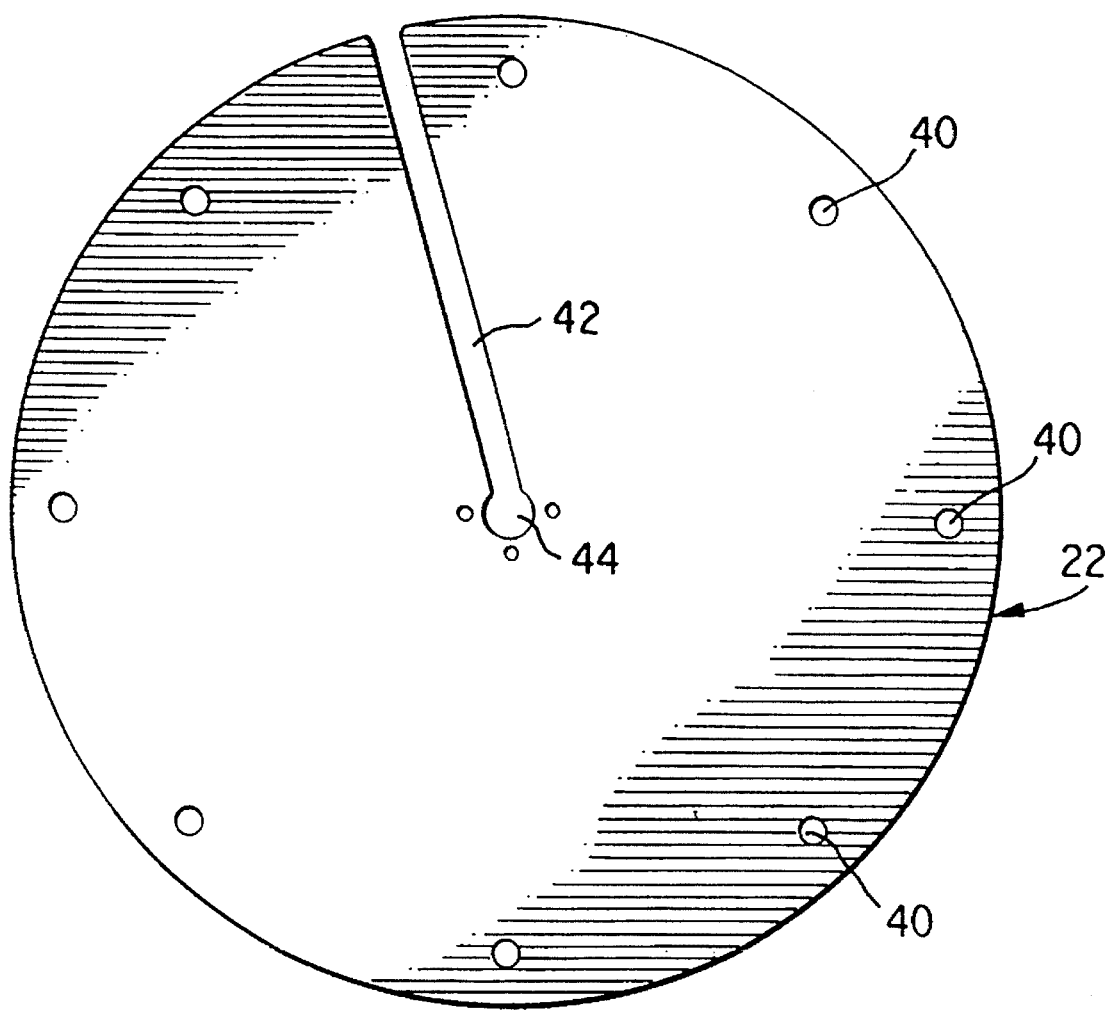
FIG. 2 is a plan view of an idler wheel in accordance with the invention.

Referring to FIG. 2, the idler wheel 22 is generally circular and includes a plurality of circular apertures 40 spaced equi-distantly around the circumference thereof. The diameter of the apertures 40 approximates the diameter of the supports 23 which secure the spits 16 to the wheel 22 and the apertures are positioned around the idler wheel so that each aperture aligns with a corresponding notch 30 in the gear wheel 20. The idler wheel 22 further includes an elongated slot 42 terminating in a rounded end 44, where the width of the slot and diameter of the rounded end approximate the diameter of the main shaft 24.

Figure 6:
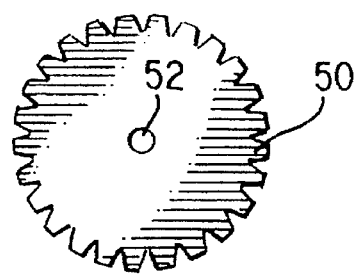
FIG. 6 is a plan view of a planetary spit gear in accordance with the invention.

One end of each spit 16 is provided with a gear 50 as illustrated in FIG. 6. Preferably, the gears 50 are welded to the spits 16 or bolted as will be described in more detail below. As will be understood by those skilled in the art, the pitch diameter and number of teeth formed on the gear 50 are selected in accordance with the desired spit rotation speed, the number of spits to be positioned within the rotisserie 10, and the size of the rotisserie. The gear 50 further includes a central aperture 52 sized to receive one of the spit supports.

Figure 3:
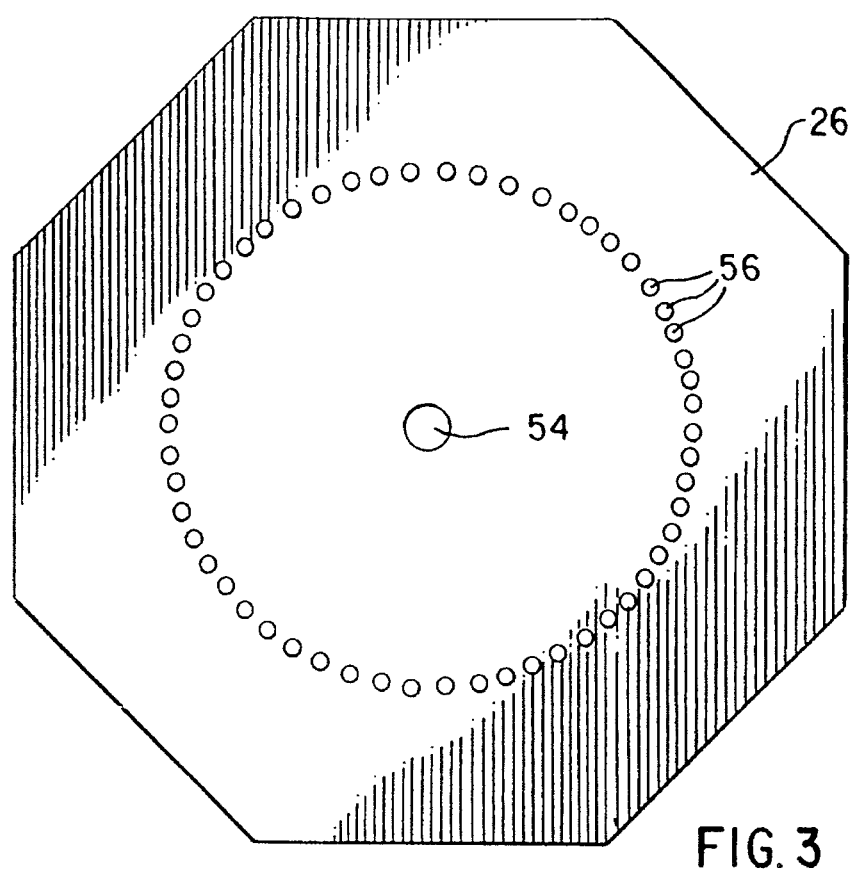
FIG. 3 is a plan view of gearing plate in accordance with the invention.

Referring to FIG. 3, the removable stationary gearing plate 26 may be octagonal or round to eliminate sharp corners and includes a central aperture 54 which fits around the main shaft 24. The plate is 26 secured to the first side wall 12 of the rotisserie 10 for example, by bolts, although other suitable attachment means, such as welding, could also be used. The plate 26 includes a plurality of pin-like projections 56 uniformly arranged in a circular pattern about the center of the plate. It will be appreciated by those skilled in the art that the projections 56 could be mounted directly on the wall 12 of the rotisserie without an intermediate plate.

Figure 5:
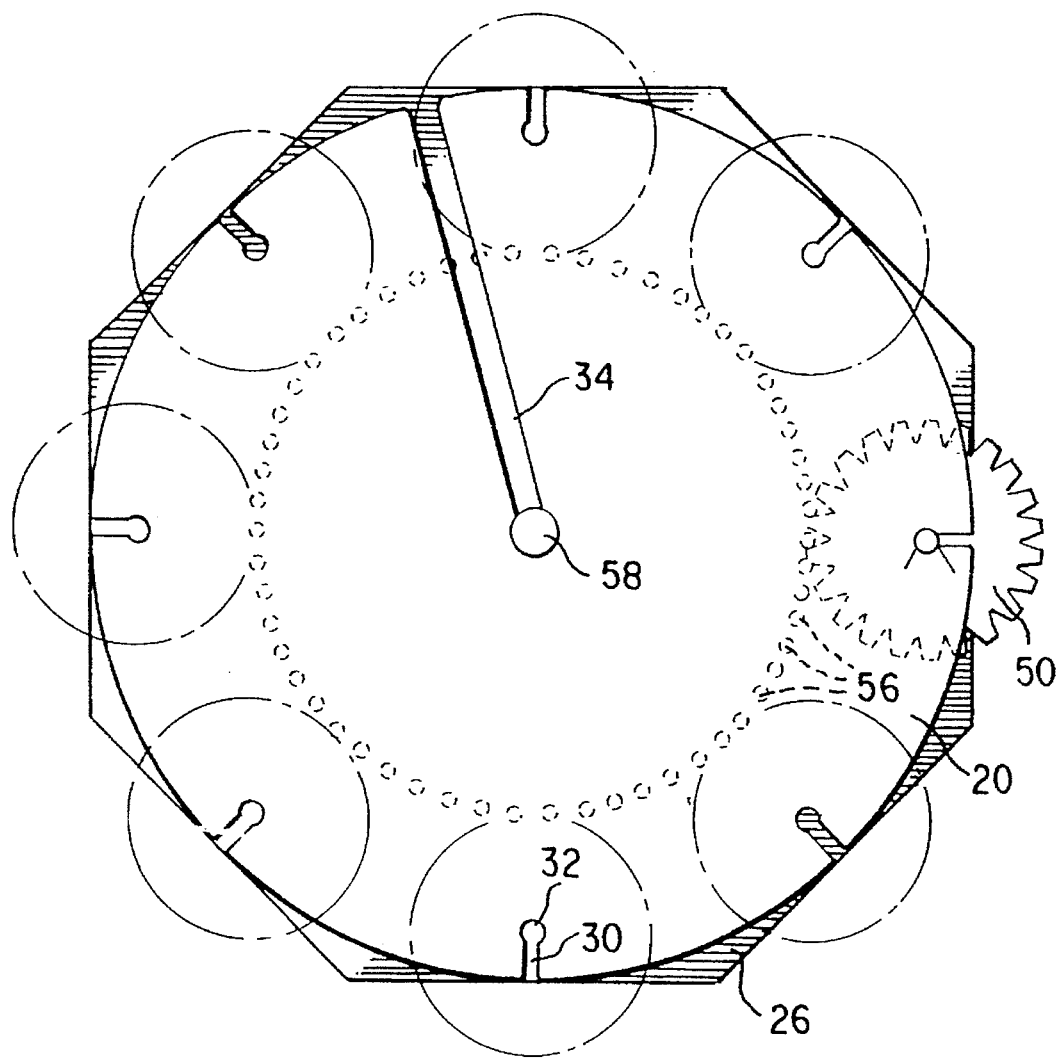
FIG. 5 is an end view of the assembled planetary gear arrangement within the rotisserie.
Figure 7:
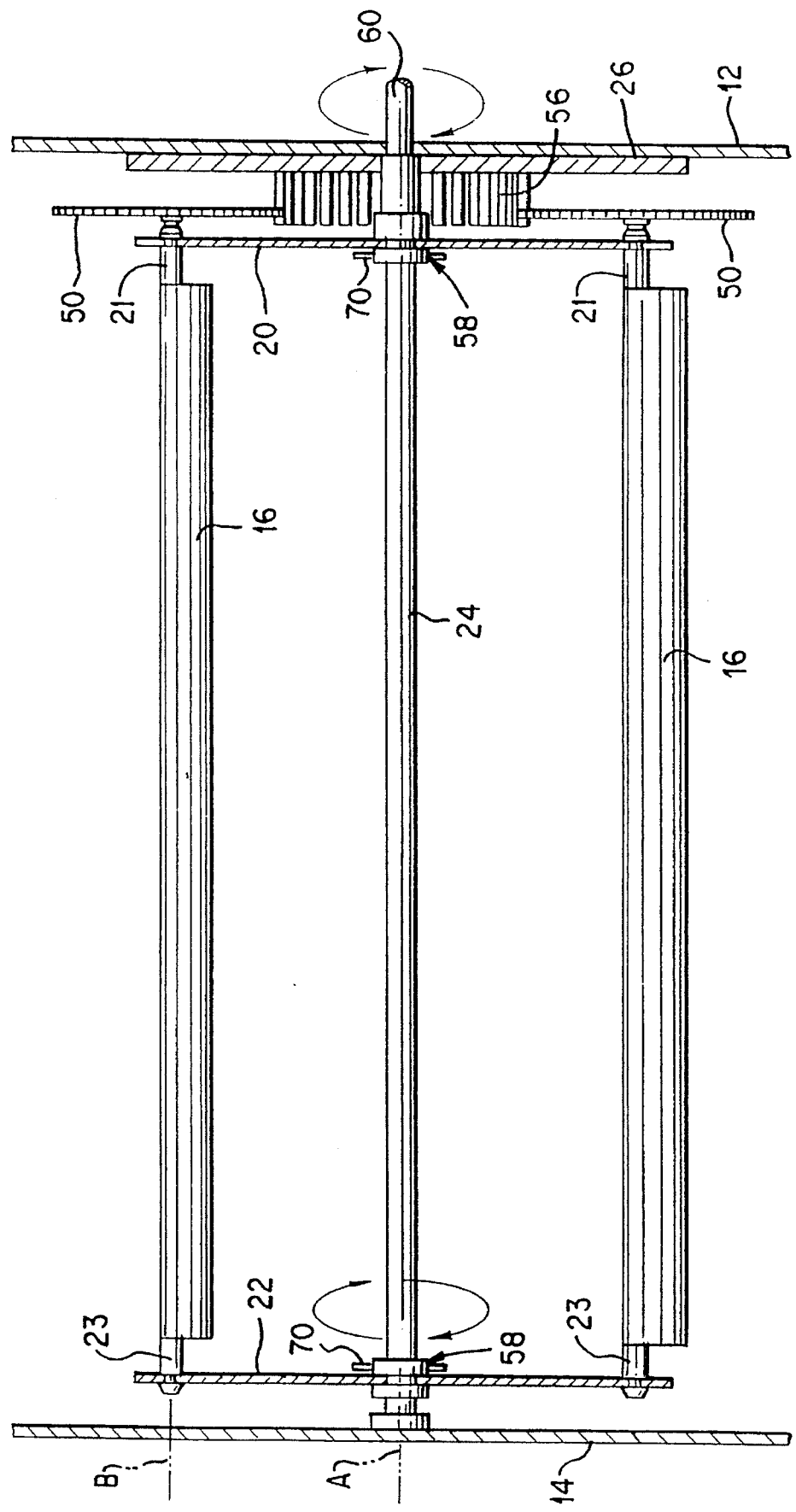
FIG. 7 is a side view of the gear wheel further illustrating the planetary gear system.

As further illustrated in FIGS. 5 and 7, the gearing plate 26 is mounted to the first side wall 12 of the rotisserie 10 such that the pins 56 on the wheel project inwardly towards the gear wheel 20 in the interior of the rotisserie. In this position, the gears 50 on the spits 16 engage the projections 56 on the gearing plate 26. Clamps 58 are provided to clamp the gear and idler wheels 20, 22 in place, preventing horizontal and vertical movement of the wheels relative to the main shaft 24 but allowing for rotational movement of the wheels relative to the shaft axis A. The main shaft 24 is coupled to a drive shaft 60 rotatably driven by a motor (not shown). As drive shaft 60 is rotated, the main shaft 24 rotates, further rotating the gear wheel 20 and idler wheel 22 in synchronization about a longitudinal axis of the main shaft A. This rotational movement causes the spits 16 carried on the wheels to also rotate in a circular path about the main shaft axis A. Circular movement of the spits 16 further causes the teeth on the planetary gears 50 to mesh with the projecting pins 56 on the stationary plate 26, effecting rotation of each spit 16 about its own longitudinal axis B.

FIG. 8 illustrates the spits as supported by the gear and idler wheels 20, 22 in greater detail. As described above, each spit includes supports 21, 23 which are secured to the gear wheel and idler wheel 20, 22 respectively. The idler support 23 includes a necked region 64. The gear support 21 includes first and second necked regions 66, 68 wherein the first necked region 66 has a diameter which is slightly larger than the second necked region 68 and slightly larger than the width of the notches 30. To attach or load a spit 16 in the rotisserie 10, the idler support 23 is first inserted into one of the circular apertures 40 in the idler wheel 22 beyond the necked region 64 as shown in FIG. 8a. Next, the second necked region 68 of the gear support 21 of the spit is inserted through one of the notches 30 on the gear wheel 20 and positioned within the rounded end 32 of the notch. In the last step in the loading process, the spit 16 is then shifted horizontally, to the right in FIG. 8a, to seat the wider first necked region 66 of the gear support 21 within the rounded end 32. This shift simultaneously seats the necked region 64 on the idler support 23 within the circular aperture 40 in the idler wheel. FIG. 8b illustrates the resulting loaded position of the spit supports 21, 23 relative to the gear and idler wheels 20, 22. Alternatively, the necked region 64 on the idler support 23 may be used without the first necked region 64 on the gear support 21, or vice versa, to provide left or right spit support locks, respectively.

As described above, each notch 30 on the gear wheel has a width which is slightly smaller than both the diameter of the rounded end 32 and the width of the necked region 66. The narrower width of the notches acts to prevent the gear supports 21 from falling out of the notches once the spits 16 have been loaded in the rotisserie and seated within the rounded ends 32 of the gear wheel 20 as described above. The configuration of the gear and idler wheels 20, 22 with the smaller necked portion 68 allowing slight movement within the holes 32 thus provides a self-aligning and locking mechanism for securing the spits 16 in the rotisserie 10. Further, no complicated processes are required to align the spit gears 50 with the pins 56.

The spit arrangement of the present invention comprises relatively few moving parts. As no precise tolerances are required, the parts can be manufactured at a lower cost. In particular, the gears 50 may be stamped metal parts or laser cut metal parts, therefore, no special machining is required. Alternatively, the gears 50 may be laser cut in accordance with well-known techniques.

In addition, the parts are easy to assemble and disassemble, facilitating cleaning and repair. To disassemble the system, the spits 16 are unloaded by moving the spits towards the idler wheel 22 to unseat the first necked region 66 of the gear support 21 and align the second necked region 68 within the rounded end 32 of the notch 30 on the gear wheel 20. The gear wheel support 21 can then be removed from the gear wheel 20 by moving the second necked region 68 through the notch 30 in the gear wheel and removing the idler wheel support 23 through the aperture 40. Once the spits 16 have been removed, the main shaft 24 can be disengaged by manually loosening the clamps 58 adjacent each side wall 12, 14 of the rotisserie 10 using the finger grips 70 provided. Once the clamps 58 have been loosened, the gear wheel 20 and idler wheel 22 are removed. Subsequently, the shaft 24 can be removed.

The planetary gear system of the present invention can be quickly and easily installed in non-planetary rotisserie devices. The present invention may be conveniently provided in kit form including stamped metal gears 50 adapted to be welded onto an end of each spit 16 and a plate 26 adapted to be mounted on an existing wall in the rotisserie. The kit may also include a metal spacer member corresponding to the second necked portion 68 which may be cut to the appropriate length and welded to the planetary gear 50 and gear support 21 of each spit 16. To retro-fit a rotisserie, the existing spits, supports, and shaft are removed in accordance with standard procedures. Once these components have been removed, the gearing plate 26 is attached to the side wall of the rotisserie 10 adjacent the motor, preferably by bolts or welding, as described above. The planetary spit gears 50 are then welded or otherwise secured to the ends of the gear supports 21 on the spits 16. Alternatively, spits with gears 50 already mounted may be provided for retro-fit. After the gearing plate 26 has been mounted, the main shaft 24 is recoupled to the drive shaft 60. Next, the gear and idler wheels 20, 22 are positioned over the main shaft 24, aligned, and clamped into position. Lastly, the spits 16 are loaded onto the gear and idler 20, 22 wheels as in the manner previously described.

When welded to the ends of the spits 16, the gears 50 provide a pedestal-type base which can advantageously be used to support the spits 16 in a vertical position, facilitating the positioning of food thereon.

Figure 9:
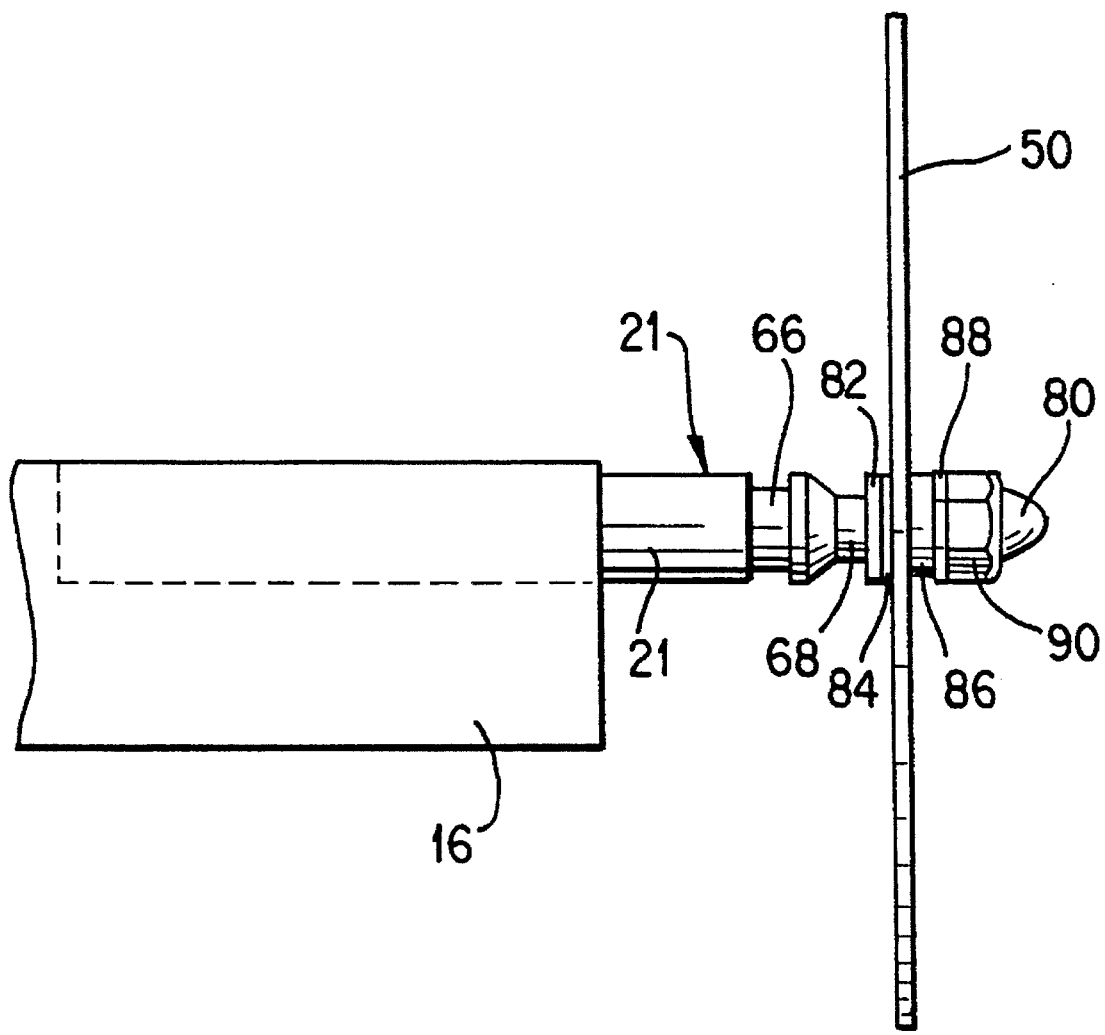
FIG. 9 illustrates an alternative arrangement for attaching the gears to the spits.

As an alternative to welding the gears 50, the gears may be attached to the gear supports 21 in the manner illustrated in FIG. 9. In this embodiment, the end of the gear support 21 includes a threaded portion 80 and facing surface 82. To secure the gear 50 to the support 21, a first resilient bushing 84, such as a neoprene O-ring, is positioned against the facing surface 82. Next, the gear 50 is positioned against the first bushing 84. Those skilled in the art will recognize that the gear 50 includes a configured opening, such as a rectangular hole having rounded ends (not shown), cooperating with a similarly shaped threaded portion 80 to prevent rotation of the gear about its central axis once placed on the support 21. A second resilient bushing or O-ring 86 is then positioned over the support adjacent the gear 50. Lastly, a washer 88 is positioned on the support 21 and a nut 90 is threaded onto the threaded portion 80 of the support to secure the assembly thereon. When attached in this manner, the resilient bushings 84, 86 advantageously act to absorb shock should the spit 16 be dropped, thereby protecting the gear 50 and reducing the risk of damage to the gear itself during ordinary use. The kit form of the present invention may include the resilient bushings 84, 86, the washer 88, and nut 90 for attaching the gears 50 to the spits 16 in this manner.

As will be apparent to those skilled in the art, various modifications and adaptations of the embodiments described above will become readily apparent without departure from the spirit and scope of the invention, the scope of which is defined in the appended claims.

What is claimed is:

1. A rotisserie comprising:

a housing defining an interior of said rotisserie and including at least first and second opposed walls;

a shaft positioned between said first and second walls of said housing for rotation therebetween;

a first wheel positioned adjacent said first wall and rotatably driven by said shaft;

a second wheel positioned adjacent said second wall and rotatably driven by said shaft in synchronization with said first wheel;

a plurality of elongated spits extending between said first and second wheels and supported for rotation thereby, wherein a first end of each of said spits includes a gear member secured thereto; and a plurality of pins arranged around said shaft and mounted on a plate secured to one of said walls for engaging said gear members on said spits as said spits are rotated by said first and second wheels to effect rotation of each of said spits about a longitudinal axis thereof; and wherein said plate is welded to said one of said opposed walls.

2. A rotisserie comprising:

a housing defining an interior of said rotisserie and including at least first and second opposed walls;

a shaft positioned between said first and second walls of said housing for rotation therebetween;

a first wheel positioned adjacent said first wall and rotatably driven by said shaft;

a second wheel positioned adjacent said second wall and rotatably driven by said shaft in synchronization with said first wheel;

a plurality of elongated spits extending between said first and second wheels and supported for rotation thereby, wherein a first end of each of said spits includes a gear member secured thereto; and a plurality of pins arranged around said shaft and mounted on a plate secured to one of said walls for engaging said gear members on said spits as said spits are rotated by said first and second wheels to effect rotation of each of said spits about a longitudinal axis thereof;

wherein said first end of each of said spits includes a facing surface and a threaded portion, each spit further comprising:

a first resilient bushing positioned on said first end adjacent said facing surface;

a second resilient bushing positioned on said first end, wherein said gear is positioned on said first end of said spit between said first and second resilient bushings;

a washer positioned on said first end adjacent said second resilient bushing; and a nut threaded on said threaded end of said spit adjacent said washer to secure said gear on said first end of said spit.

3. A rotary spit system for a rotisserie, said rotisserie having an interior defined by a housing including at least first and second opposed walls, said gear system comprising:

a rotatable shaft adapted to be disposed between said first and second opposed walls of said housing;

projecting means comprising pins mounted on a plate adapted to be secured to said first wall of said rotisserie and with said pins extending toward the second wall of said rotisserie;

a gear wheel adapted to be positioned adjacent said projecting means and rotatably driven by said rotatable shaft;

an idler wheel adapted to be positioned adjacent said second wall of said housing and rotatably driven by said rotatable shaft in synchronization with said gear wheel; and at least one spit supported between said gear wheel and said idler wheel, wherein rotation of said gear wheel and said idler wheel about said rotating shaft rotates said at least one spit in a circular path about said rotating shaft, said at least one spit further including a planetary gear secured to a first end thereof, said planetary gear meshing with said projecting means during rotation of said spit about said rotatable shaft to further rotate said spit about a longitudinal axis thereof.

4. The gear system of claim 3, wherein said pins are arranged in a symmetrical pattern about said shaft when mounted to the first wall.

5. A method for converting an existing rotisserie to a planetary spit system, said rotisserie including at least one spit supported for rotation between first and second supports, said method comprising:

removing said at least lone spit from said supports;

securing a planetary gear to said at least one spit;

securing projecting means onto a rotisserie wall, said projecting means being configured and dimensioned for cooperation with said planetary gear to effect rotation of said at least one spit about its longitudinal axis; and reassembling the at least one spit on said supports such that a planetary gear cooperates with said projecting means to rotate the at least one spit about a longitudinal axis thereof as the at least one spit is rotated by said supports.

6. The method of claim 5, wherein said step of securing said planetary gear to said at least one spit comprises welding said gear to said at least one spit.

7. The method of claim 5, wherein said step of securing said projecting means to said rotisserie comprises securing a plate having projecting means mounted thereto to the wall of said rotisserie.

8. A rotisserie comprising:

a housing defining an interior of said rotisserie and including at least first and second opposed walls;

a shaft positioned between said first and second walls of said housing for rotation therebetween;

a first wheel positioned adjacent said first wall and rotatably driven by said shaft;

a second wheel positioned adjacent said second wall and rotatably driven by said shaft in synchronization with said first wheel;

a plurality of elongated spits extending between said first and second wheels and supported for rotation thereby, wherein a first end of each of said spits includes a gear member secured thereto, a facing surface and a threaded portion, each spit further comprising a first resilient bushing positioned on said first end adjacent said facing surface, a second resilient bushing positioned on said first end, wherein said gear is positioned on said first end of said spit between said first and second resilient bushings, a washer positioned on said first end adjacent said second resilient bushing, and a nut threaded on said threaded end of said spit adjacent said washer to secure said gear on said first end of said spit; and projecting means mounted on one of said walls for engaging said gear members on said spits as said spits are rotated by said first and second wheels to effect rotation of each of said spits about a longitudinal axis thereof.

9. A kit for converting a rotisserie to a planetary spit system, said rotisserie including first and second supports rotatably driven by a shaft, wherein at least one spit extends between said supports and is supported for rotation therebetween and a first end of said at least one spit includes a facing surface and a threaded portion, said kit comprising:

at least one gear adapted to be secured to said at least one spit;

a plate configured and dimensioned to be secured to a wall of said rotisserie, wherein said plate includes projecting means for cooperating with said at least one gear on said at least one spit to effect rotation of said at least one spit about a longitudinal axis thereof as said at least one spit is rotated by said supports;

a first resilient bushing adapted to be positioned on said first end adjacent said facing surface;

a second resilient bushing adapted to be positioned on said first end, wherein said at least one gear is provided with a central aperture configured and dimensioned to be received on said at least one spit and positioned between said first and second resilient bushings;

a washer configured and dimensioned to be positioned on said first end adjacent said second resilient bushing; and a nut adapted to be threaded on said threaded end of said at least one spit adjacent said washer to secure said at least one gear on said first end of said at least one spit.

* * * * *